US005449976A

United States Patent [19]

Kemp et al.

[11] Patent Number: 5,449,976

[45] Date of Patent: Sep. 12, 1995

[54] CONTROL UNIT FOR CONTROLLING A STROBE LIGH OR THE LIKE

[76] Inventors: Raymond J. Kemp, P.O. Box 1216, Wildomar, Calif. 92595; Susan E. Leighton, 20160 Palomar, Lake Elisnore, Calif. 92330; Philip D. Hawkins, 4729 Hillside Ave., Norco, Calif. 91760

[21] Appl. No.: 20,056

[22] Filed: Feb. 19, 1993

[30] Foreign Application Priority Data

Feb. 19, 1992 [EP] European Pat. Off. ........... 92102762

[51] Int. Cl.$^6$ .......................... H05B 37/00; H02J 9/06

[52] U.S. Cl. ....................................... 315/86; 315/134; 315/151; 307/66

[58] Field of Search ................. 315/86, 129, 134, 151; 307/46, 48, 66

[56] References Cited

U.S. PATENT DOCUMENTS

| | | | |
|---|---|---|---|
| 3,411,036 | 11/1968 | Casey | 315/151 |
| 3,541,504 | 11/1970 | Bush | 315/134 |
| 3,833,895 | 9/1974 | Fecteau | 340/224 |
| 3,890,534 | 6/1975 | Horowitz | 315/134 |
| 4,441,031 | 4/1984 | Moriya et al. | 307/46 |
| 4,531,114 | 7/1985 | Topol et al. | 340/539 |
| 4,996,517 | 2/1991 | Kringen et al. | 340/506 |

*Primary Examiner*—Richard A. Bertsch
*Assistant Examiner*—Roland G. McAndrews, Jr.
*Attorney, Agent, or Firm*—Bruce A. Jagger; Natan Epstein

[57] ABSTRACT

A control unit for controlling a strobe light or the like, in particular for use in an alarm system or an emergency locator, is characterized in that a direct current power supply unit is provided which is activated to drive the strobe light when an external power supply unit which is adapted to drive the strobe light is deactivated.

10 Claims, 2 Drawing Sheets

CONTROL UNIT FOR CONTROLLING A STROBE LIGH OR THE LIKE

BACKGROUND OF THE INVENTION

The present invention relates to a control unit for controlling a strobe light or the like, in particular for use in an alarm system or an emergency locator.

Strobe lights or flashing lamps are often used to indicate that at a particular location assistance of any kind is needed. This may be the case for instance in emergency situations where such an indicator functions as a direct guide to the respective premises.

A strobe light serving as an indicator means is disclosed in U.S. Pat. No. 5,012,507 wherein it is used in connection with a telephone activated emergency system. For controlling the strobe light, a monitoring circuit is provided to turn on the light if and only if a predesignated sequence of digits is dialled from a telephone set to which the monitory circuits is connected.

SUMMARY OF THE INVENTION

It is the objective of the invention to provide a control unit for use with a strobe light or the like in an alarm system which guarantees the reliability of the strobe light operation.

The objective of the present invention is achieved by a control unit for controlling a strobe light or the like, wherein a direct current power supply unit is provided which is activated to drive the strobe light when an external power supply unit which is adapted to drive the strobe light is deactivated.

In a further development of the present invention a means is provided which prevents operating the direct current power supply unit as long as the external power supply unit is active.

In another development of the present invention an optical sensor is arranged in the vicinity of the strobe light, the optical sensor providing feedback information on the operational state of the strobe light.

According to the invention a direct current power supply unit is provided which is activated to drive the strobe light when an external power supply unit which is adapted to drive the strobe light is deactivated. When any preselected number is dialled, an alarm system attached to the telephone line will cause an external power signal to be sent to the control unit. At the same time the strobe light will begin to flash. When the caller hangs up the telephone, the alarm system can turn off the external power supply and the direct current power supply unit will take over and supply current for the strobe light.

It is preferred that means are provided which prevent operation of the direct current power supply unit as long as the external power supply unit is active. This guarantees that no current is drawn from the direct current power supply unit unnecessarily, so that full power will be available if it is needed.

According to a further preferred embodiment of the invention an optical sensor is arranged in the vicinity of the strobe light. The optical sensor providing feedback information on the operational state of said strobe light. This feedback information can be passed to the user of the alarm system to indicate that the control unit and the strobe light are in a non-active state.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

Figure 1:
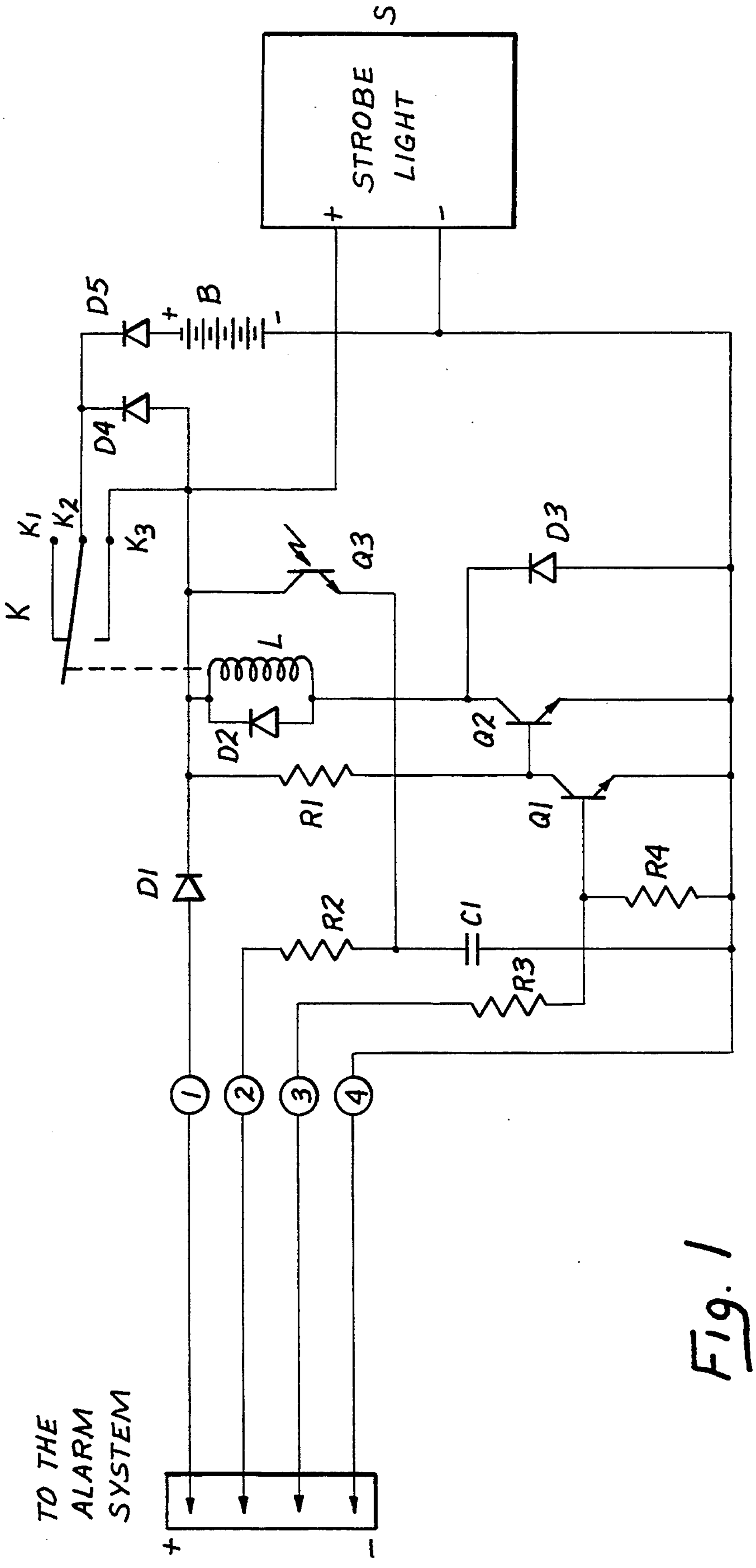
FIG. 1 shows a first circuit using a strobe light as a first embodiment of the invention.

With reference to FIG. 1, when alarm conditions are given, the alarm system, for instance, an emergency system as described, but not limited to, in the co-pending patent application 92 102 762.9, corresponding to U.S. Ser. No. 08/020,056 filed on Feb. 19, 1993 sends a +12 volt signal to a control unit wire pin 1. In the control unit, the external power of +12 volts is connected through a diode D1 to the coal L of a relay K, further to the positive terminal of the strobe light S to the resistor R1 and to a terminal K3 of the relay K. The voltage is also supplied to an optical sensor Q3 which is a phototransistor in the depicted embodiment. The current passing through resistor R1 turns on a transistor Q2, thus completing the circuit through the coil L of the relay K to the ground return on pin 4, and the relay K operates, connecting terminals K2 and K3 of the relay K. The strobe light S begins to flash, energized by the +12 volts. No current is drawn form a battery B which is provided in the circuit between terminals K2 and K3 because the +12 volts reverse bias a diode D5 which is connected between terminal K2 and the battery B. Now, when the telephone is hung up, the external voltage of +12 volt is turned off, and The diode D5 does not block any longer, so that the battery B can provide a current energizing the strobe light S. The optical sensor Q3 detects the flashes of light from the strobe light S. When a flash is detected, a +12 volt signal, in case of an external energy supply, or a battery voltage signal which can be +9 volt, in case the unit is operating on the battery, is transmitted via pin 2 to the alarm system where it can be used to indicate that the strobe light S is operated, for example by driving a light emitting diode. Since the flash from the strobe light S is extremely brief, a capacitor C1 is used to lengthen the operating time of the light emitting diode.

A pin 3 is provided for resetting the control unit. If the strobe light signals are no longer needed, a suitable signal is sent via pin 3 that turns on a transistor Q1 which then turns transistor Q2 off. The terminals K2 and K3 of the relay K are then open, so that the strobe light S is switched off.

When the control unit is operating on the battery, it will continue to operate even if the connecting cable to the alarm system is severed and even if all of the conductors were to be shorted together. It is only the information of the optical sensor Q3 which will be lost, and it will no longer be possible to switch the strobe light S of by sending a signal via pin 3, but the primary indicator function will continue without interruption. A Standard 9 volt alcaline battery can operate the control unit for one hour or more.

Figure 2:
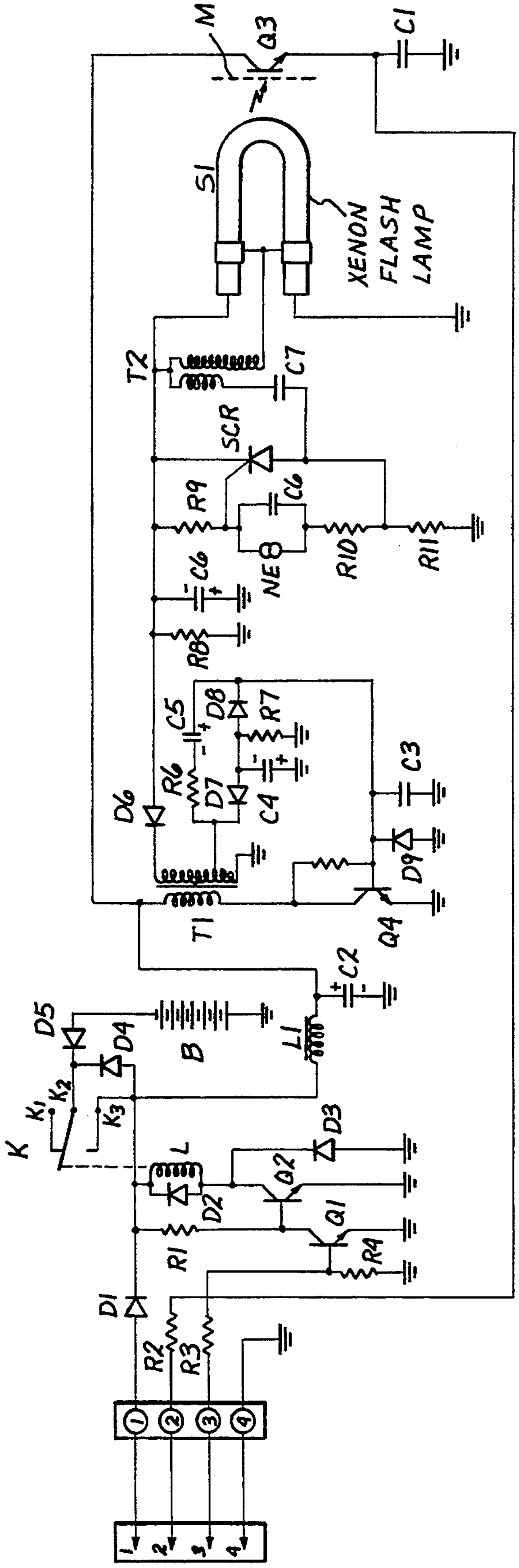
FIG. 2 shows a second circuit using a xenon flash tube as a second embodiment of the invention.

FIG. 2 shows a second embodiment of the present invention using a xenon flash lamp instead of a strobe light. The basic elements of the control unit are the same as in FIG. 1, and the same reference signs have been used to indicate similar circuit elements. Additional elements are required to drive a xenon flash tube S1. Terminal K3 of relay K is now connected via coil L1 having a ferrite core to the primary of a transformator T1 and further to the collector of photo transistor Q3. Signals induced at the secondary of the transformator T1 are processed by a circuit having a resistor R6 serially connected to capacitor C5 and two diodes D7 and D8 connected in parallel thereto, the high-resistance directions of the diodes D7, D8 being opposite to one another. Capacitor C4 and resistor R7 are both connected to ground and to the anodes of diodes D7, D8. The signals generated in the above described circuit are applied to the base of transistor Q4. The collector of this transistor Q4 is connected with the primary of transistor T1, its emitted to ground. A resistor R5 is provided between collector and base, and filtering diode D9 and capacitor C3 are both connected to ground and to the base of transistor Q4.

A silicon controlled rectifier SCR acts as a trigger, and thus controls operation of the xenon flash lamp S1. Its anode is connected to ground via resistor R11 and to a first coil of a transformator T2 which An turn applies the voltage signals generated by the silicon controlled rectifier. SCR to the flash lamp S1. Voltage pulses rectified by diode D6 are applied to the cathode of the silicon controlled rectifier SCR and via resistor R9 to its gate. An oscillating circuit having capacitor C7, element NE and resistor R10 is adapted to generate suitable control pulses applied to the gate. Thus, an operating mode similar to that of the embodiment of FIG. 1 can be achieved.

The phototransistor Q3 which is arranged to lie adjacent to the xenon flash tube S1 is optionally provided with a mask that partly filters the light emitted from the flash tube S1.

The ground connection is indicated by a triangle.

In both embodiments, interconnecting cables to the alarm system having a length as required are provided.

The features disclosed in the foregoing description, in the claims and/or in the accompanying drawings may, both seperately and in any combination thefor, be material for realising the invention in diverse forms thereof.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A strobe light emergency indicator system, comprising:

an alarm system including a primary power supply;

a strobe unit remote from said alarm system including a strobe light and strobe output sensing means for supplying a feedback signal indicative of strobe operation;

a plurality of conductors between said alarm system and said remote unit including first conductor means for supplying electrical power from said primary power supply to said strobe and second conductor means for carrying said feedback signal to said alarm system;

whereby presence of said feedback signal at said alarm system is indicative of both operation of the strobe light and of continuity of said conductor means.

2. The system of claim 1 said plurality of conductors further comprising third conductor means connected for carrying a strobe reset signal from said alarm system to said strobe unit operative for disabling electrical power to said strobe light.

3. The system of claim 1 further comprising backup battery means and relay means in said strobe unit, said relay means switchable in response to application of power to said first conductor means from a normally open condition to a closed condition for supplying electrical power to said strobe light, means enabling supply of said power from said battery through said relay means only in the absence of power from said relay means in said closed condition upon interruption of power from said first conductor means whereby operation of said strobe light is not interrupted by interruption of power from said first conductor means.

4. The system of claim 3 wherein said backup battery continues to power said strobe light in either an open circuit or a short circuit condition of said first conductor means following interruption of power from said first conductor means.

5. A strobe light emergency indicator system, comprising:

an alarm system including a primary power supply;

a strobe unit remote from said alarm system, said strobe unit including a strobe light and backup battery means;

first conductor means connected between said alarm system and said strobe unit for supplying electrical power from said primary power supply to initiate operation of said strobe upon occurrence of an alarm condition of said alarm system, said first conductor means carrying no power to said strobe unit in a stand-by condition of said alarm system;

means for supplying power from said battery for continuing said operation of said strobe upon interruption of power from said first conductor means, such that once initiated, operation of the strobe is not interrupted by cutting of said first conductor means;

strobe output sensing means in said strobe unit for supplying a feedback signal indicative of strobe operation; and second conductor means for carrying said feedback signal to said alarm system, such that both operation of said strobe light and continuity of said first and second conductor means between said strobe unit and said alarm system may be verified by presence of said feedback signal at said alarm system.

6. The system of claim 5 further comprising reset conductor means connected between said alarm system and said strobe unit for carrying a strobe reset signal from said alarm system to said strobe unit, said reset signal operative for terminating operation of said strobe light.

7. The system of claim 5 wherein said means for supplying power from said battery comprise relay means in said strobe unit, said relay means switchable in response to application of power to said first conductor means from a normally open condition to a closed condition for supplying electrical power to said strobe light, means enabling supply of said power from said battery through said relay means only in the absence of power from said first conductor means, said battery being connected for holding said relay means in said closed condition upon interruption of power from said first conductor means so that operation of said strobe light is not defeated by interruption of power from said first conductor means.

8. A strobe light emergency indicator system, comprising:

an alarm system including a primary power supply;

a strobe unit remote from said alarm system, said strobe unit having a strobe light, backup battery means contained in said strobe unit and strobe output sensing means for supplying a feedback signal indicative of strobe operation;

first conductor means connected for supplying electrical power from said primary power supply thereby to initiate operation of said strobe upon occurrence of an alarm condition of said alarm system, said first conductor means carrying no power to said strobe unit in a stand-by condition of said alarm system;

means for supplying power from said battery for continuing said operation of said strobe in the event of interruption of power from said first conductor means;

second conductor means for carrying said feedback signal to said alarm system; and third conductor means connected for carrying a strobe reset signal from said alarm system to said strobe unit, said reset signal operative for terminating operation of said strobe light.

9. The system of claim 8 wherein said strobe output sensing means includes an optical sensor adjacent to said strobe light in said strobe unit.

10. A strobe light emergency indicator system, comprising:

an alarm system including a primary power supply;

a strobe unit remote from said alarm system, said strobe unit including a strobe light and backup battery means;

first conductor means connected between said alarm system and said strobe unit for supplying electrical power from said primary power supply to initiate operation of said strobe upon occurrence of an alarm condition of said alarm system, said first conductor means carrying no power to said strobe unit in a stand-by condition of said alarm system;

relay means in said strobe unit, said relay means switchable in response to application of power to said first conductor means from a normally open condition to a closed condition for supplying electrical power to said strobe light, circuit means enabling supply of said power from said battery through said relay means only in the absence of power from said first conductor means, said battery being connected for holding said relay means in said closed condition upon interruption of power from said first conductor means so that operation of said strobe light is not disabled by interruption of power from said first conductor means.

* * * * *